United States Patent [19]
Fimoff et al.

[11] Patent Number: 5,938,763
[45] Date of Patent: *Aug. 17, 1999

[54] SYSTEM FOR TRANSPOSING DATA FROM COLUMN ORDER TO ROW ORDER

[75] Inventors: Mark Fimoff, Hoffman Estates; David A. Willming, Palatine, both of Ill.

[73] Assignee: Zenith Electronics Corporation, Glenview, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,233

[22] Filed: Aug. 6, 1997

[51] Int. Cl.$^6$ ..................................................... G06F 7/00
[52] U.S. Cl. ............................................................. 712/300
[58] Field of Search ....................... 711/5, 152; 395/500, 395/898

[56] References Cited

U.S. PATENT DOCUMENTS

| | | | |
|---|---|---|---|
| 3,579,195 | 5/1971 | Hallmark et al. | 711/111 |
| 3,766,529 | 10/1973 | McLaughlin | 364/468.01 |
| 3,976,980 | 8/1976 | Hertz | 707/7 |
| 4,636,851 | 1/1987 | Drury et al. | 380/11 |
| 4,740,959 | 4/1988 | Kosugi et al. | 370/376 |
| 4,903,231 | 2/1990 | Artieri | 711/1 |
| 4,918,587 | 4/1990 | Pechter et al. | 711/218 |
| 5,055,919 | 10/1991 | Klein et al. | 358/261.1 |
| 5,206,684 | 4/1993 | Wada et al. | 355/203 |
| 5,265,237 | 11/1993 | Tobias et al. | 395/500 |
| 5,369,652 | 11/1994 | Bailey et al. | 371/37.4 |
| 5,398,328 | 3/1995 | Weber et al. | 395/500 |
| 5,481,413 | 1/1996 | Kawada et al. | 360/53 |
| 5,481,487 | 1/1996 | Jang et al. | 364/725 |
| 5,537,420 | 7/1996 | Huang | 371/2.1 |
| 5,572,532 | 11/1996 | Fimoff et al. | 371/2.2 |
| 5,572,713 | 11/1996 | Weber et al. | 395/500 |
| 5,717,899 | 2/1998 | Artieri | 395/477 |

FOREIGN PATENT DOCUMENTS

WO 95/18494 6/1995 European Pat. Off. .

OTHER PUBLICATIONS

ATSC Digital Television Standard (Annex D), Sep. 16, 1995, Sections 4.1–4.2.5, pp. 48–56.

U.S. application No. 08/687,866 filed Jul. 26, 1996.

*Primary Examiner*—Krisna Lim

[57] ABSTRACT

A data transposition system reorders successive input groups of N data elements received in column order into corresponding output groups of data elements arranged in row order. The system includes a memory having N data element storage locations and a transposition address generator for repetitively generating a series of different sequences of address signals. The address signals of each sequence are sequentially applied to the memory for reading the data elements stored at the addressed storage locations for providing the output groups of data elements. Each read data element is replaced with the data element of the next input group corresponding in order to the order of the respective address signal within its associated sequence.

16 Claims, 6 Drawing Sheets

Fig. 1

| | 12 | 14 | 16 | 18 | 20 |
|---|---|---|---|---|---|
| | A | D | G | J | M |
| | B | E | H | K | N |
| | C | F | I | L | O |

| 0 | 1 | 2 | 3 | 4 |
|---|---|---|---|---|
| 5 | 6 | 7 | 8 | 9 |
| 10 | 11 | 12 | 13 | 14 |

$M_0 = 0,1,2,3,4,5,6,7,8,9,10,11,12,13,14$

| -/A | -/B | -/C | -/D | -/E |
|---|---|---|---|---|
| -/F | -/G | -/H | -/I | -/J |
| -/K | -/L | -/M | -/N | -/O |

| A/A | B/F | C/K | D/B | E/G |
|---|---|---|---|---|
| F/L | G/C | H/H | I/M | J/D |
| K/I | L/N | M/E | N/J | O/O |

| A/A | F/L | K/I | B/F | G/C |
|---|---|---|---|---|
| L/N | C/K | H/H | M/E | D/B |
| I/M | N/J | E/G | J/D | O/O |

| A/A | L/N | I/M | F/L | C/K |
|---|---|---|---|---|
| N/J | K/I | H/H | E/G | B/F |
| M/E | J/D | G/C | D/B | O/O |

| A/A | N/J | M/E | L/N | K/I |
|---|---|---|---|---|
| J/D | I/M | H/H | G/C | F/L |
| E/G | D/B | C/K | B/F | O/O |

| A/A | J/D | E/G | N/J | I/M |
|---|---|---|---|---|
| D/B | M/E | H/H | C/K | L/N |
| G/C | B/F | K/I | F/L | O/O |

| A/A | D/B | G/C | J/D | M/E |
|---|---|---|---|---|
| B/F | E/G | H/H | K/I | N/J |
| C/K | F/L | I/M | L/N | O/O |

Fig. 3G

SYSTEM FOR TRANSPOSING DATA FROM COLUMN ORDER TO ROW ORDER

BACKGROUND OF THE INVENTION

The present invention generally relates to a system for transposing a data signal from a first received order to a second different order and, more particularly, concerns a data transposing system which is implemented using a reduced amount of memory.

In many applications, an intelligence bearing signal is encoded, transmitted, and received in the form of plural data blocks each comprising a sequence of individual data elements. Depending on the manner in which the blocks were generated, and depending on their ultimate use in the system, it is frequently necessary to transpose the data elements of each block from the order in which they were received to a different order conforming with their intended use. For example, in a high definition television system, a frame of video data may be divided into a rectangular array of relatively small data blocks to facilitate encoding of the data prior to transmission. Moreover, in order to increase encoding efficiency, it has been found convenient to arrange the data elements in each block in column order. While the video data is thus encoded and transmitted in the form of successive blocks of data elements arranged in columnar order, in the receiver it is desired to provide the data elements in a row scanned format to enable rasterization of the video data for reproducing the televised image. It is thus necessary to transpose the video data from the columnar order in which it is received to a row scanned order appropriate for reproducing the video image.

One well known technique for transposing data from one order to another is the so called ping-pong system. In this system, two memory banks each having a size corresponding to a predetermined number of data blocks are alternately operated on, such that while data is being written into one memory bank, data is simultaneously being read out of the other. By switching appropriately generated write and read address signals between the two memory banks, the data elements may be conveniently reordered in any desired format. While the ping-pong data transposition system is quite flexible, it is extremely wasteful of memory by requiring a memory capable of storing at least two times the number of data elements to be transposed.

Another known data transposition system is represented by the so-called discrete cosine transform (DCT) transposition RAM. The DCT transposition RAM represents a system in which a square array of data elements may be transposed from row to column order by alternately addressing a correspondingly configured memory for writing data elements into memory rows and reading stored data elements from memory columns. While this system requires a memory having a size corresponding only to the number of data elements to be transposed, its use is limited to transposing only square arrays of data elements.

SUMMARY OF THE INVENTION

It is accordingly, a basic object of the present invention to provide an improved system for transposing data from one order to another order.

It is a further object of the invention to provide an improved data transposition system which may be implemented using a minimum amount of memory.

It is yet a further object of the invention to provide an improved data transposition system which may be used with data elements which are arranged in configurations other than square configurations.

In accordance with one aspect of the present invention, an apparatus for reordering successive groups of N received data elements comprises memory means and address signal generating means. The memory means has N memory locations and stores N data elements. The address signal generating means repetitively generates a series of different sequences of address signals and sequentially applies the address signals of successive ones of the generated sequences to the memory means, whereby the data elements of a first group of received data elements are written into the memory means in a first predetermined order, whereby the data elements of the first group of received data elements are read out of the memory means and the data elements of a second group of received data elements are written into the memory means in a second predetermined order which is different from the first predetermined order, and whereby each data element of the first group of received data elements is read out of the memory means and is replaced by a data element of the second group of received data elements before a next data element of the first group of received data elements is read out of the memory means.

In accordance with another aspect of the present invention, a method of reordering a plurality of successively received groups of data elements, wherein each group of data elements includes N data elements, wherein the data elements in each group of data elements are received in column order, and wherein the data elements in each group of data elements are reordered into row order, comprises the following steps: writing a first group of data elements into N memory locations of a memory in a first order; and reading the first group of data elements out of the N memory locations in a second order while writing a second group of data elements into the N memory locations in the second order, wherein the first order is different from the second order.

In accordance with still another aspect of the present invention, an apparatus reorders a plurality of successively received groups of data elements. Each group of data elements includes N data elements, the data elements in each group of data elements are received in column order, and the data elements in each group of data elements are reordered into row order. The apparatus comprises a memory and an address generator. The memory has N memory locations. The address generator is arranged to generate addresses and to supply the addresses to the memory so that a first group of data elements is written into the N memory locations in a first order, so that the first group of data elements is read out of the N memory locations in a second order while a second group of data elements is written into the N memory locations in the second order, and so that the first order is different from the second order.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 is a graphical depiction of a group of fifteen data elements received in column order;

FIG. 2 is a graphical depiction of a rectangular memory array having fifteen data element memory locations, the address of each corresponding to the number in the respective memory location;

FIG. 3A is a graphical representation of the operation of the memory array of FIG. 2 wherein a first address set causes unknown data elements to be read out from, and a first set of data elements to be written into, the memory array, and wherein the designation X/Y in the memory locations of the memory array represents a read out data element X and a written in data element Y;

FIG. 3B is a graphical representation of the operation of the memory array of FIG. 2 wherein a second address set causes the first set of data elements to be read out of, and a second set of data elements to be written into, the memory array;

FIG. 3C is a graphical representation of the operation of the memory array of FIG. 2 wherein a third address set causes the second set of data elements to be read out of, and a third set of data elements to be written into, the memory array;

FIG. 3D is a graphical representation of the operation of the memory array of FIG. 2 wherein a fourth address set causes the third set of data elements to be read out of, and a fourth set of data elements to be written into, the memory array;

FIG. 3E is a graphical representation of the operation of the memory array of FIG. 2 wherein a fifth address set causes the fourth set of data elements to be read out of, and a fifth set of data elements to be written into, the memory array;

FIG. 3F is a graphical representation of the operation of the memory array of FIG. 2 wherein a sixth address set causes the fifth set of data elements to be read out of, and a sixth set of data elements to be written into, the memory array;

FIG. 3G is a graphical representation of the operation of the memory array of FIG. 2 wherein the first address set causes the sixth set of data elements to be read out of, and a seventh set of data elements to be written into, the memory array;

DESCRIPTION OF THE PREFERRED EMBODIMENTS

Figure 4:
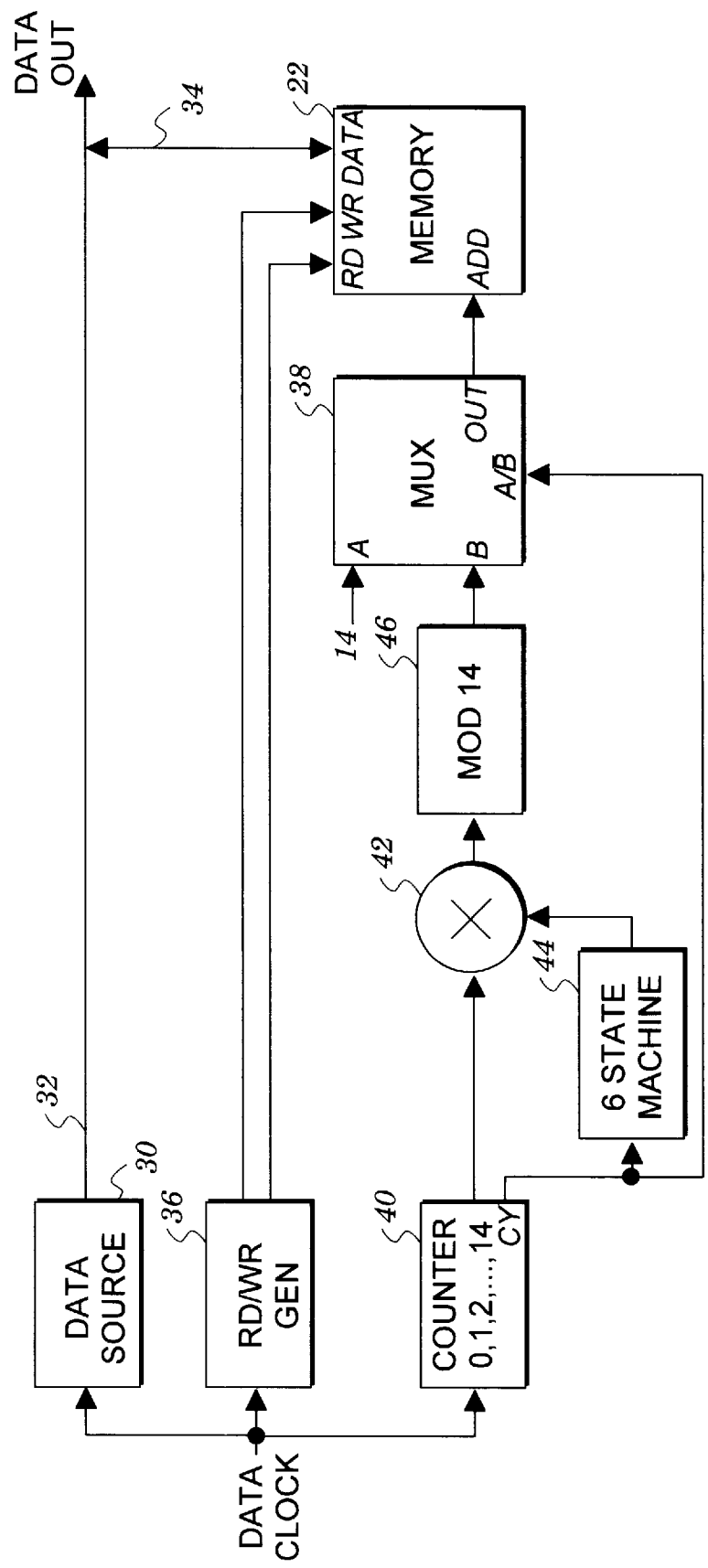
FIG. 4 is a block diagram illustrating one embodiment of the present invention.

The principles of the invention will initially be explained in connection with the simplified numerical examples set forth in FIGS. 1–3 and the related circuit shown in FIG. 4. Thereafter, specific embodiments illustrating the application of these principles, and refinements thereof, will be provided.

As shown in FIG. 1, a rectangular array 10 of fifteen data elements A–0 is depicted and may, for example, spatially represent a corresponding portion of a frame of ten video data, it being understood that each of the individual elements A–0 could actually represent a yet finer series of constituent data elements. The rectangular array 10 comprises five blocks 12, 14, 16, 18, and 20 of data elements. Each such block includes three data elements arranged in column order (e.g. the block 12 comprises elements A-B-C). The data elements A–0, which are arranged in column-oriented blocks as described to facilitate encoding, are transmitted one block after the other in a top to bottom order beginning with the block 12. Thus, the rectangular array 10 comprises a group of data elements which are sequentially transmitted and received in the order A-B-C-D-E-F-G-H-I-J-K-L-M-N-O. Successive like groups are transmitted and received in the same order to constitute the entire video frame.

It will be appreciated that, while the data elements of the rectangular array 10 are transmitted and received in a columnar order, it is desired to present the data elements in a rasterized or row-oriented form for reproduction of the image represented thereby. In other words, it is desired to provide the received data elements A–0 in the order A-D-G-J-M-B-E-H-K-N-C-F-I-L-O. What is thus needed is a data transposition system for reordering each group of fifteen received data elements from the received column order to the desired row order. The manner in which this transposition is effected according to the invention is described below.

More particularly, FIG. 2 depicts a 5×3 memory 22 having numbered memory locations 0–14 corresponding to the rectangular array 10. As will be explained in more detail hereinafter, the desired transposition of data elements A–0 is effected by generating a repeating series of sequences of address signals and, in response to each address signal in a given sequence, by reading the data element stored in the memory location identified thereby and by replacing its contents with the data element of the next group of data elements having the same relative position in such group as the address signal within the sequence. The foregoing is diagrammatically illustrated in FIGS. 3A–3G which depict the data elements read from, and written into, the various locations of the memory 22 in response to the address signals by the notation X/Y, where X represents a data element read from an addressed memory location and Y represents a data element written into the same memory location.

As shown in FIG. 3A, it is initially assumed that the contents of the memory 22 is unknown. The initial address sequence MO shown above the memory 22 results in the first received group of data elements A–0 being written into the memory 22 in the locations shown. The fact that unknown data elements are read out of the memory 22 in response to initial sequence MO is reflected by the dashes in the X position of each corresponding memory location.

As shown in FIG. 3B, the memory 22 is operated in response to the second address signal sequence $M_1$ for reading the data elements identified thereby and for storing the data elements of the next successive group of data elements. More specifically, it will be observed that, in response to the first address signal of the sequence $M_1$, stored data element A is read from storage location 0 and replaced with data element A (i.e. A/A) of the next group of data elements. Next, data element D is read from storage location 3 and replaced by the second data element B of the next group (i.e. D/B). Continuing, data element G is next read from storage location 6 and replaced by the third data element C of the next group (i.e. G/C), and so on. Thus, it will be seen that, while the data elements are being received in the column order A,B,C, ... N, 0, they are being read from the memory 22 in the desired row or rasterized order A,D,G, ... L,O.

FIGS. 3C–3F illustrate the subsequent operation of the memory 22 in response to the third, fourth, fifth, and sixth sequences $M_2$, $M_3$, $M_4$, and $M_5$, respectively, of address signals. In each case, it will be seen that the data elements are read out of the memory 22 in the desired rasterized order. Finally, in FIG. 3G, the memory 22 is restored to the condition illustrated in FIG. 3A, and the entire process is repeated beginning with address signal sequence $M_0$.

The different address signal sequences $M_i$ required to transpose to row order a given size array of data elements received in column order may be mathematically derived according to the following expressions:

$$M_i(n) = (n*R^i) \bmod(N-1) \quad (1)$$

for n=0,1,2, ... ,N–2

$$M_i(n) = N-1$$

for n=N–1.

In the foregoing expressions, N is the number of data elements in the array or group (and the number of storage locations in the memory 22), and R is the number of rows in the array. Thus, in the example of FIGS. 1–3, N=15 and R=3. In addition, the number L of different addressing sequences that these expressions will produce before returning to the initial sequence can be determined by finding the smallest number L which satisfies the expression:

$$(R^L) \bmod(N-1) = 1 \quad (2)$$

for L not 0.

It can easily be shown that, for the example given above (R=3 and N=15), L=6.

For purposes of understanding, the expression for $M_i(n)$ will now be used to calculate some exemplary address signal terms of the different sequences identified in FIG. 3. Thus, the fourth term (n=3) of the second sequence (i=1) is:

$$M_1(3) = (3*3^1) \bmod(14)$$
$$= (9) \bmod(14)$$
$$= 9.$$

Similarly, the ninth term (n=8) in the third sequence (i=2) is:

$$M_2(8) = (8*3^2) \bmod(14)$$
$$= (72) \bmod(14)$$
$$= 2$$

The fifth term (n=4) in the sixth (i=5) and final sequence is:

$$M_5(4) = (4*3^5) \bmod(14)$$
$$= (972) \bmod(14)$$
$$= 6.$$

FIG. 4 depicts a hardware embodiment of the data transposition system of the invention implementing expression (1) described above. The successive groups of data blocks 12–20 are applied by a data source 30 to a data bus 32 at the rate of a data clock signal. It will be understood that the data source 30 may actually comprise part of a data receiver and is shown as a source of data for purposes of simplicity only. The data bus 32 is coupled to a data port of the memory 22 by a bidirectional bus 34. The memory 22 receives respective read and write control signals from a read/write generator 36, which is also operated in response to the data clock signal, and address signals from an output of a multiplexer 38. A counter 40 is clocked by the data clock signal for repetitively applying counts 0,1, ... 14 to one input of a multiplier 42 and an overflow signal to a state machine 44 (which may alternatively be implemented in the form of a small ROM). The output of the state machine 44 is applied to the second input of the multiplier 42 whose output is coupled to the B input of the multiplexer 38 by a modulo 14 circuit 46. The A input of the multiplexer 38 is hard-wire connected to a count of 14, and the select input A/B of the multiplexer 38 is supplied from the overflow output of the counter 40.

In operation, the output of the counter 40 applied to the multiplier 42 corresponds to the index n of the address signal sequences in expression (1) above, while the state machine 44 is programmed to supply the appropriate value $R^i$ each time it is clocked by an overflow pulse from the counter 40. The output of the multiplier 42, which therefore represents the term $(n*R^i)$ in expression (1), is converted to modulo 14 form by the modulo 14 circuit 46 and is applied to the B input of the multiplexer 38. The multiplexer 38 applies its B input to the address port of the memory 22 for the first fourteen address terms of each sequence, and applies count 14 (i.e., N–1) from its A input for the last (i.e., 15th) term of each sequence. It will thus be understood that the output of the multiplexer 38 implements expression (1) and, therefore, represents the repeating sequences w of address signals shown in FIGS. 3A–3G. These address signal sequences are used to read, and write, data elements from, and to, the memory 22 as explained in connection with FIGS. 3A–3G to effect the desired transposition of received data elements from column order to row order.

Figure 5:
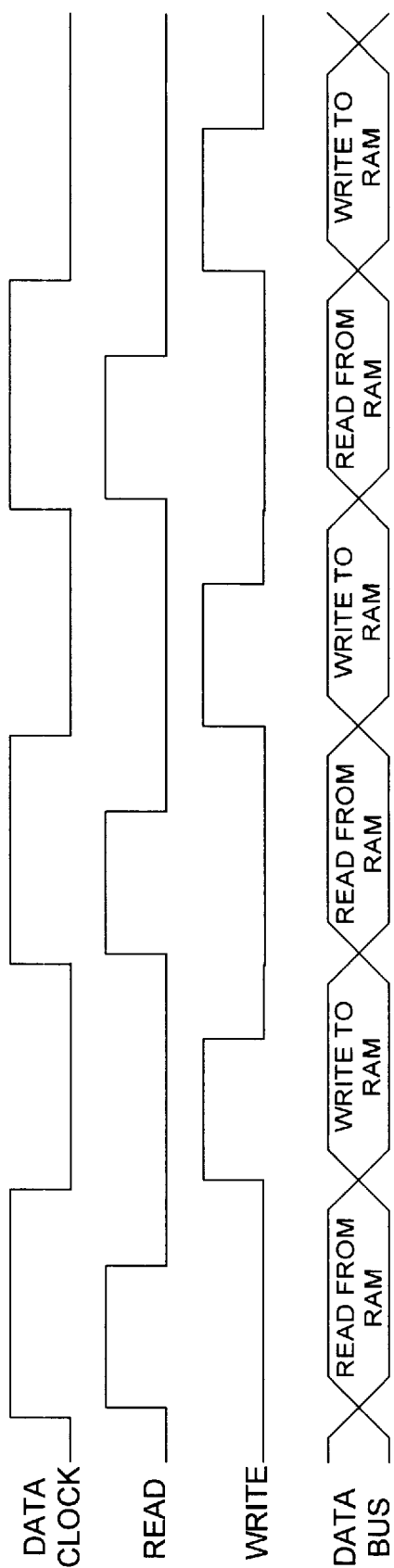
FIG. 5 is a waveform diagram useful in explaining the operation of the embodiment of the invention shown in FIG. 4.

The operation of the memory 22 may be more easily understood with reference to the timing signals of FIG. 5. In particular, a read signal is asserted by the generator 36 during each positive half cycle of the data clock signal, and a write signal is asserted each negative half cycle of the clock signal. As a consequence, in response to each applied address signal of a given sequence, a data element is read from the addressed memory location of the memory 22 and applied to the data output by the busses 34 and 32, and is replaced with the next data element from the subsequent group of data elements provided at the output of the data source 30. Thus, the read/write operation X/Y is executed each cycle of the data clock signal in accordance with the address signal sequences supplied to the address port of the memory 22 to implement expression (1) above and thereby the data transposition algorithm of the invention.

Figure 6:
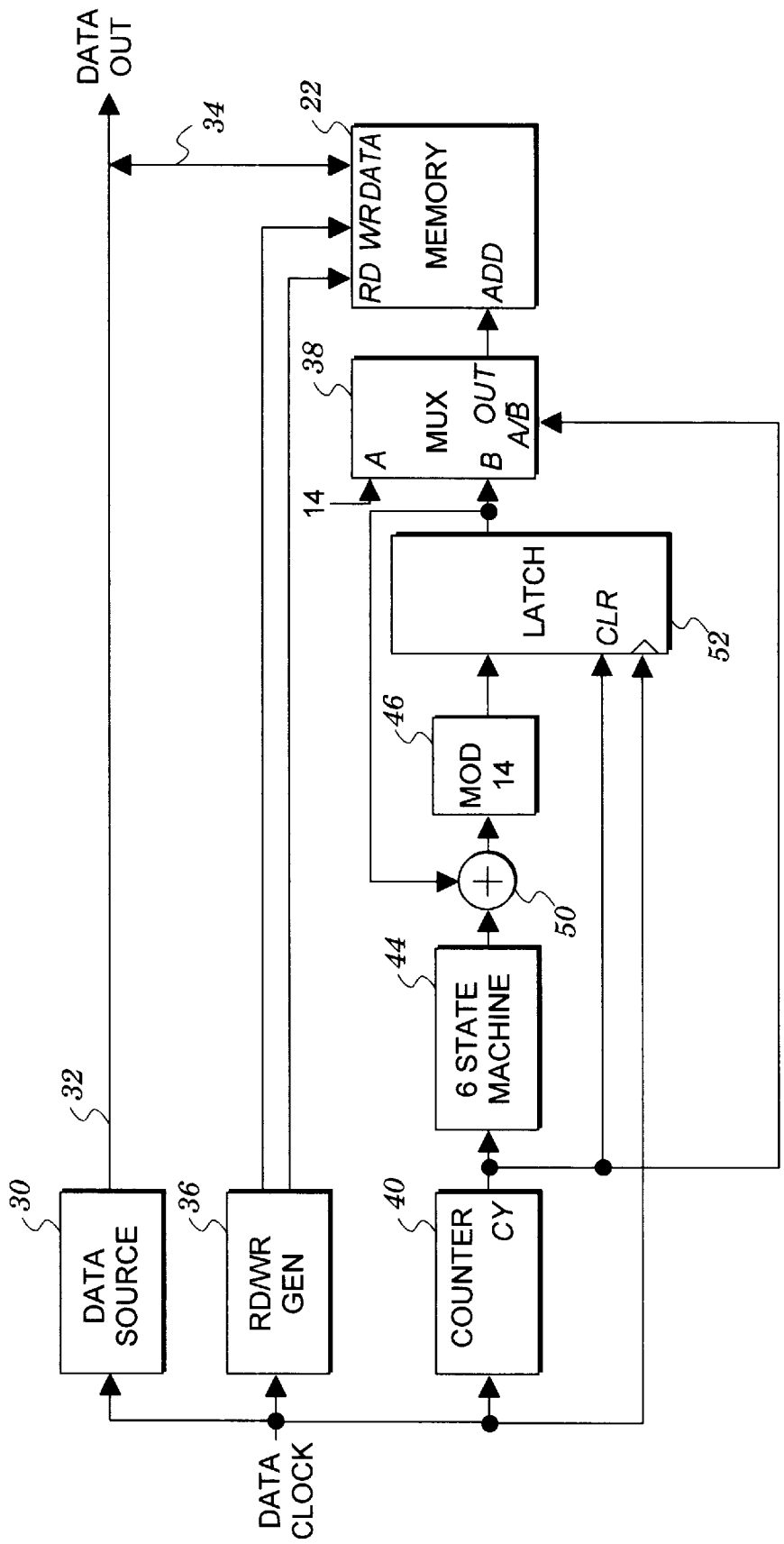
FIG. 6 is a block diagram of another embodiment of the present invention.

FIG. 6 illustrates another embodiment of the data transposition system of the invention which eliminates the need for the multiplier 42 in the FIG. 4 embodiment. The FIG. 6 embodiment generates the same address signal sequence $M_i$ as the FIG. 4 embodiment, but does so by implementing the following expression:

$$M_i(n) = 0 \qquad \text{for } n = 0 \quad (3)$$

-continued $$M_i(n) = (M_i(n-1) + R^i) \mod(N-1) \quad \text{for } n = 1, 2, \ldots, N-2$$

$$M_i(n) = N - 1 \quad \text{for } n = N - 1$$

In this embodiment, the state machine 44 again generates the values $R^i$ but, in this case, applies them to a first input of an adder 50. The output of the adder 50 is coupled through the modulo 14 circuit 46 to the input of a latch 52 whose output is fed back to a second input of the adder 50, and is also coupled to the B input of the multiplexer 38. Thus, during each fifteen count sequence, the appropriate value $R^i$ for the respective sequence is recursively added to itself modulo 14 using the latch 52 and the adder 50 so as to produce the correct values for the address signal sequence $M_i(n)$ according to expression (3). The first address term in each sequence is always 0 (i.e., $M_i(0)=0$). This value is produced by clearing the latch 52 at the end of the previous sequence in response to the overflow output of the counter 40. The last address term in each sequence is always 14. This value is produced, as in the embodiment of FIG. 4, by using the overflow output of the counter 40 to route a hard wired value of 14 directly to the address port of the memory 22.

It will be appreciated that, to facilitate an understanding of the invention, the foregoing examples were somewhat simplified by intentionally limiting the number of data elements required to be transposed and thereby the size of the associated memory. The invention should not, however, be limited thereby, and may be used to transpose virtually any number of data elements. For example, in a high definition television system, it may be necessary to transpose 120 data elements using a memory having a rectangular array of memory locations comprising 6 rows by 20 columns (i.e. N=120). The principles of the invention, however, remain unchanged. The same hardware embodiments illustrated in FIGS. 4 and 6 are thus applicable with some minor modifications. In particular, the size of the memory 22 must be increased to accommodate the 6×20 array of memory locations, the counter 40 must be modified to count 0–119, the circuit 46 must be modified to perform a modulo 119 conversion, and the state machine 44 (or a corresponding ROM) must be reprogrammed to repetitively generate sixteen different $R^i$ values, i.e., one for each of sixteen different 119 term address signal sequences.

Figures 7, 8:
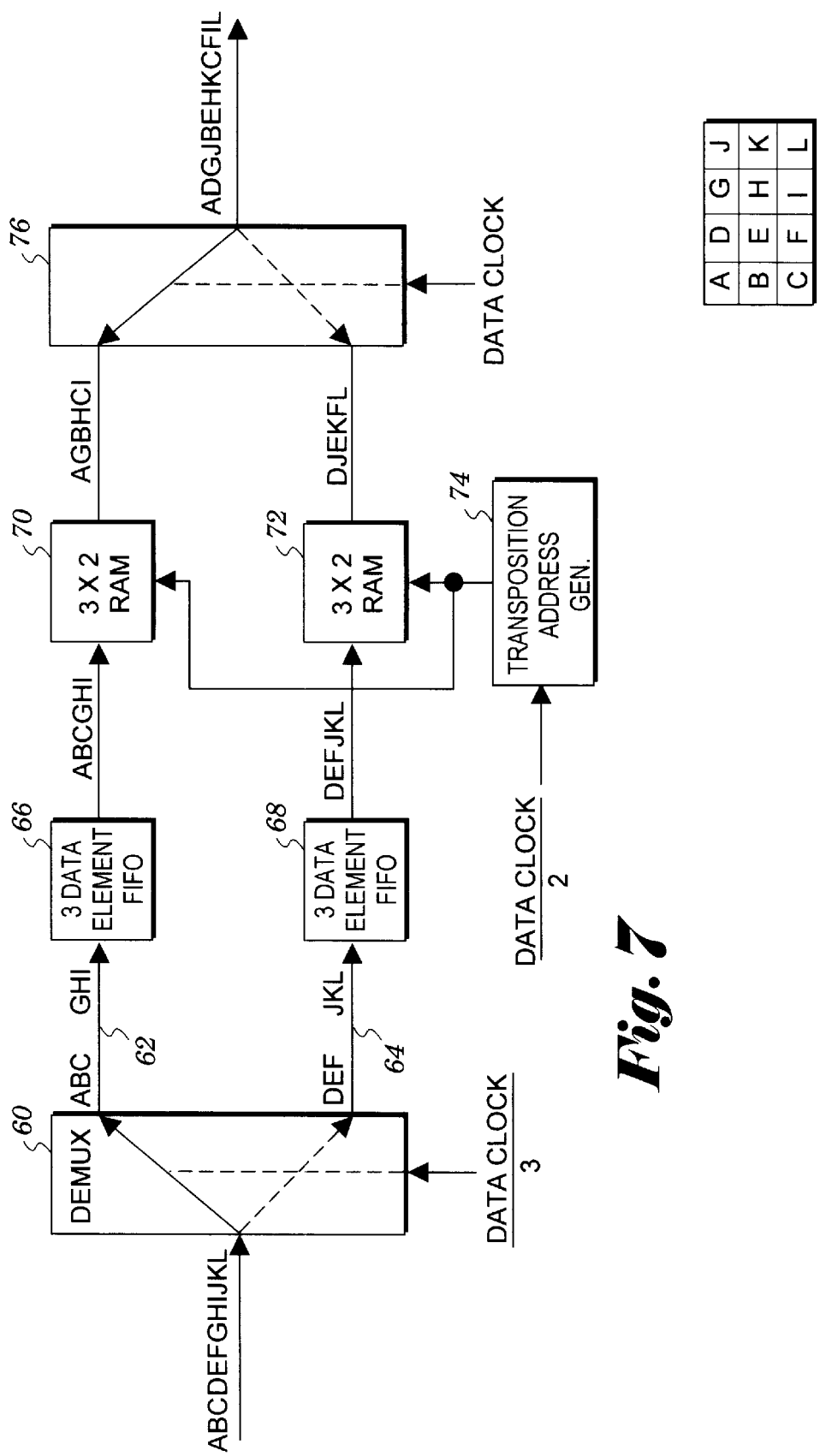
FIG. 7 is a block diagram of yet another embodiment of the invention.
FIG. 8 is a graphical depiction of a group of twelve data elements received in column order and useful in explaining the operation of the embodiment of FIG. 7.

The data transposition system described above requires one half of the memory of the prior art ping-pong arrangement, but the memory must have an address access time that is about 25% faster because it must execute a read/write operation in the same amount of time that the two memory banks in the ping-pong system effect a simultaneous read-write. FIG. 7 shows an alternate embodiment of the invention which deals with this limitation in which the memory is operated at one-half the speed relative to the memories in the FIGS. 4 and 6 embodiments.

For example, if the received data elements A–L are received as a 3×4 data element array illustrated in FIG. 8. the data elements are received in the order ABCDEFGHIJKL and are desired to be transposed to the rasterized order ADGJBEHKCFIL. The necessary transposition can be effected by the embodiments of FIGS. 4 or 6 using the parameters N=12 and R=3. Thus, five repeating twelve term address sequences must be generated to appropriately operate the twelve data element memory.

In FIG. 7, the same transposition is effected while operating the memory at one-half the speed. In particular, the input data is applied to a demultiplexer 60 which is switched at a rate of one-third of the data clock frequency to separate alternate blocks of three data elements onto a pair of respective data busses 62 and 64. After buffering in respective FIFO buffers 66 and 68, the data elements are applied to the data ports of a pair of respective 3×2 RAM banks 70 and 72. The RAM banks 70 and 72 are simultaneously addressed by a transposition address generator 74 constructed in accordance with the embodiments of FIGS. 4 or 6, and are operated at one-half the data clock rate. It will be understood that the parameters used to implement the transposition address generator 74 are N=6 and R=3 such that four six term address sequences at one-half the data clock rate are repetitively applied to the RAM banks 70 and 72. The data elements read from the RAM banks 70 and 72 are applied to a multiplexer 76 which is switched at the data clock rate to reconstruct the transposed data sequence at its output.

The FIG. 7 embodiment suffers a memory penalty in the form of the FIFO buffers 66 and 68. However, this memory penalty significantly decreases as a percentage of overall memory in a more practical system which transposes data element arrays having many more columns than the exemplary array shown in FIG. 8.

Figure 9:
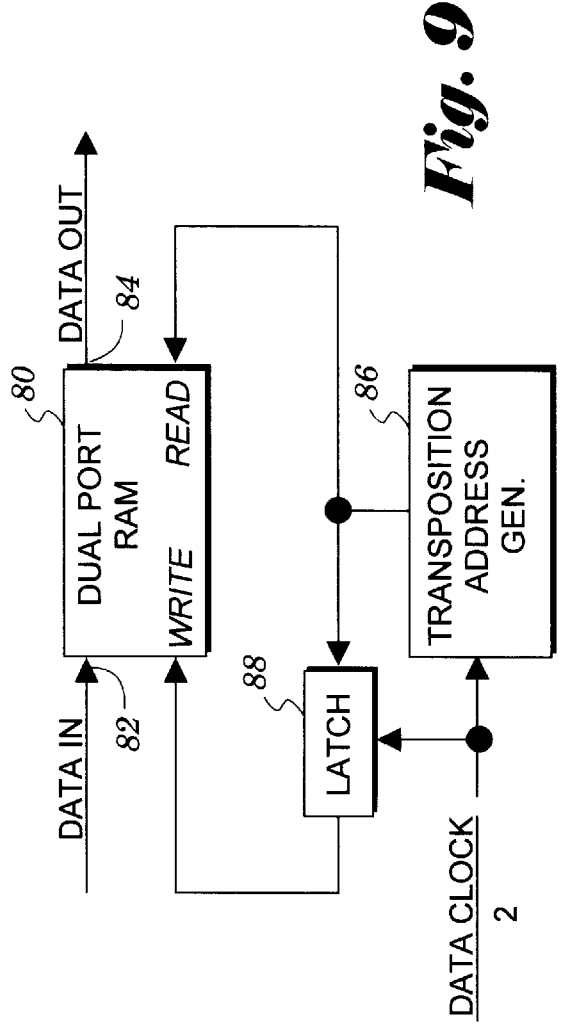
FIG. 9 is a-block diagram of a still further embodiment of the invention.
Figure 10:
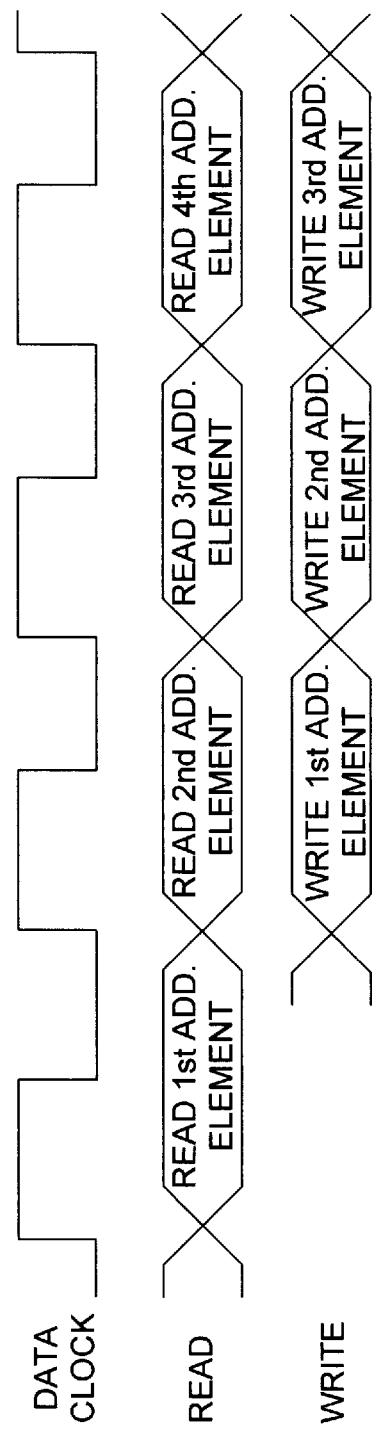
FIG. 10 is a waveform diagram useful in explaining the operation of the embodiment of the invention shown in FIG. 9.

FIG. 9 illustrates another embodiment of the invention which has the same memory speed requirement as the prior art ping-pong arrangement, but employs a somewhat costlier memory. In particular, this embodiment comprises a dual port RAM 80 having a data input port 82 and a separate data output port 84. A transposition address generator 86, constructed in accordance with the embodiment of FIGS. 4 or 6 and operated at a rate of a data clock, generates address signal sequences $M_i$ which are applied to a Read input of the dual port RAM 80 and to an input of a latch 88. The latch 88 delays the address sequences $M_i$ by an interval corresponding to the data clock before applying them to a Write input of the dual port RAM 80. The relationships between the data clock and the memory read and write signals is thus as illustrated in FIG. 10. It will thus be seen that the invention is implemented in this embodiment by reading each data element from the dual port RAM 80 according to the sequence $M_i$ while simultaneously writing the appropriate input data element into the previously read memory location.

Certain modifications of the present invention have been discussed above. Other modifications will occur to those practicing in the art of the present invention. For example, the present invention has been described above in connection with the transposition of column ordered data elements to row ordered data elements. However, the present invention is also useful in the transposition of row ordered data elements to column ordered data elements, or in the transposition of data elements in any order to data elements in any other order.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

That which is claimed is:

1. Apparatus for reordering successive groups of N received data elements, the apparatus comprising:

memory means having N memory locations for storing N data elements;

address signal generating means for repetitively generating a series of different sequences of address signals and for sequentially applying the address signals of successive ones of the generated sequences to the memory means, whereby the data elements of a first group of received data elements are written into the memory means in a first predetermined order, whereby the data elements of the first group of received data elements are read out of the memory means and the data elements of a second group of received data elements are written into the memory means in a second predetermined order which is different from the first predetermined order, and whereby each data element of the first group of received data elements is read out of the memory means and is replaced by a data element of the second group of received data elements before a next data element of the first group of received data elements is read out of the memory means; and, wherein the memory means comprises first and second memory banks each having N/2 memory locations and including means for applying the address signals of each of the generated sequences to each of the memory banks.

2. The apparatus of claim 1 wherein the received data elements are in column order as received and wherein the data elements are read out of the memory means in row order.

3. The apparatus of claim 1 wherein the memory locations of the memory means are effectively arranged in R rows and wherein the address signal generating means comprises means for generating each of the series of different sequences of address signals according to the following expression:

$$M_i(n) = (n * R^i)\bmod(N-1) \text{ for } n = 0, 1, 2, ..., N-2$$

$$M_i(n) = N - 1 \quad\quad\quad \text{for } n = N - 1,$$

where i is a number incremented from 0 to (L−1) for each of the different sequence, and L is selected as the smallest non-zero integer satisfying the expression $(R^L) \bmod(N-1) = 1$.

4. The apparatus of claim 1 wherein each of the groups of N received data elements is received as a plurality of successive columns of data elements, wherein the columns of the plurality of columns are even and odd numbered columns, and wherein the apparatus includes means for supplying the even numbered columns of data elements to the first memory bank and the odd numbered columns of data elements to the second memory bank.

5. The apparatus of claim 4 wherein the address signal generating means repetitively generates a series of different sequences of address signals in order to read data elements out of the first and second memory banks, and wherein the apparatus includes means for combining the data elements read from the first and second memory banks into a serial stream of data elements comprising successive data elements alternately read from the first and second memory banks.

6. Apparatus for reordering successive groups of N received data elements, the apparatus comprising:

memory means having N memory locations for storing N data elements;

address signal generating means for repetitively generating a series of different sequences of address signals and for sequentially applying the address signals of successive ones of the generated sequences to the memory means, whereby the data elements of a first group of received data elements are written into the memory means in a first predetermined order, whereby the data elements of the first group of received data elements are read out of the memory means and the data elements of a second group of received data elements are written into the memory means in a second predetermined order which is different from the first predetermined order, and whereby each data element of the first group of received data elements is read out of the memory means and is replaced by a data element of the second group of received data elements before a next data element of the first group of received data elements is read out of the memory means;

wherein the memory means comprises a dual port RAM having data input and output ports and Read and Write control inputs, wherein the apparatus includes means for applying the address signals of each of the generated different sequences of address signals to the Read and Write control inputs, and wherein the address signals applied to the Write control input are delayed by one data element relative to the address signals applied to the Read control input.

7. A method of reordering a plurality of successively received groups of data elements, wherein each group of data elements includes N data elements, wherein the data elements in each group of data elements are received in column order, and wherein the data elements in each group of data elements are reordered into row order, the method comprising:

writing a first group of data elements into N memory locations of a memory in a first order;

reading the first group of data elements out of the N memory locations in a second order while writing a second group of data elements into the N memory locations in the second order;

reading the second group of data elements out of the N memory locations in a third order while writing a third group of data elements into the N memory locations in the third order, wherein the first, second, and third orders are different; and, wherein the memory has first and second memory banks, wherein each of the first and second memory banks has N/2 memory locations, and wherein the method further comprises the step of substantially simultaneously applying address signals to both of the memory banks.

8. The method of claim 7 wherein each of the received groups of data elements is received as a plurality of successive columns of R data elements, wherein the data elements are read and written in accordance with L different sequences of N address signals, the method further comprising the step of generating each of the L different sequences of N address signals according to the expression:

$$M_i(n) = (n * R^i)\bmod(N-1) \text{ for } n = 0, 1, 2 ..., N-2$$

$$M_i(n) = N - 1 \quad\quad\quad \text{for } n = N - 1$$

where i is a number incremented from 0 to (L−1).

9. The method of claim 7 wherein each group of data elements is received as a plurality of successive columns of data elements, wherein the successive columns of data elements are even and odd numbered columns, and wherein the method further comprises the step of supplying the even numbered columns of data elements to the first memory bank and the odd numbered columns of data elements to the second memory bank.

10. The method of claim 9 including the step of reading data elements from the first and second memory banks into a serial stream of data elements so that the serial stream of data elements comprises data elements alternately read from the first and second memory banks.

11. A method of reordering a plurality of successively received groups of data elements, wherein each group of data elements includes N data elements, wherein the data elements in each group of data elements are received in column order, and wherein the data elements in each group of data elements are reordered into row order, the method comprising:

writing a first group of data elements into N memory locations of a memory in a first order;

reading the first group of data elements out of the N memory locations in a second order while writing a second group of data elements into the N memory locations in the second order;

reading the second group of data elements out of the N memory locations in a third order while writing a third group of data elements into the N memory locations in the third order, wherein the first, second, and third orders are different; and, wherein the memory comprises a dual port RAM having data input and output ports and Read and Write control inputs, and wherein the method further comprises the steps of applying address signals to the Read control input, delaying the address signals by one data element, and applying the delayed address signals to the Write control input.

12. An apparatus for reordering a plurality of successively received groups of data elements, wherein each group of data elements includes N data elements, wherein the data elements in each group of data elements are received in a first order, and wherein the data elements in each group of data elements are reordered into a second order, the apparatus comprising:

a memory having N memory locations;

an address generator arranged to generate addresses and to supply the addresses to the memory so that a first group of data elements is written into the N memory locations in the first order, so that the first group of data elements is read out of the N memory locations in the second order while a second group of data elements is written into the N memory locations in the second order, and so that the first order is different from the second order; and, wherein the memory has first and second memory banks, wherein each of the first and second memory banks has N/2 memory locations, and wherein the address generator is arranged to substantially simultaneously apply address signals to both of the memory banks.

13. The apparatus of claim 12 wherein each of the received groups of data elements is received as a plurality of successive sub-groups of R data elements, wherein the address generator is arranged to cause data elements to be read and written in accordance with L different sequences of N addresses, and wherein the generator is arranged to generate the L different sequences of N addresses according to the expression:

$$M_i(n) = (n * R^i) \mod(N-1) \quad \text{for } n = 0, 1, 2 \ldots, N-2$$
$$M_i(n) = N - 1 \quad \text{for } n = N - 1$$

where i is a number incremented from 0 to (L−1).

14. The apparatus of claim 12 wherein each group of data elements is received as a plurality of successive sub-groups of data elements, wherein the successive sub-groups of data elements are even and odd numbered sub-groups, and wherein the address generator is arranged to supply addresses so that even numbered sub-groups of data elements are stored in a first memory bank and so that odd numbered sub-groups of data elements are stored in a second memory bank.

15. The apparatus of claim 14 wherein the address generator is arranged to supply addresses to the first and second memory banks so that data elements are read from the first and second memory banks into a serial stream of data elements and so that the serial stream of data elements comprises data elements alternately read from the first and second memory banks.

16. An apparatus for reordering a plurality of successively received groups of data elements, wherein each group of data elements includes N data elements, wherein the data elements in each group of data elements are received in a first order, and wherein the data elements in each group of data elements are reordered into a second order, the apparatus comprising:

a memory having N memory locations;

an address generator arranged to generate addresses and to supply the addresses to the memory so that a first group of data elements is written into the N memory locations in the first order, so that the first group of data elements is read out of the N memory locations in the second order while a second group of data elements is written into the N memory locations in the second order, and so that the first order is different from the second order; and, wherein the memory comprises a dual port RAM having data input and output ports and Read and Write control inputs, and wherein the address generator is arranged to supply addresses to the Read control input, to delay the addresses by one data element, and to supply the delayed addresses to the Write control input.

* * * * *